United States Patent Office 3,446,709
Patented May 27, 1969

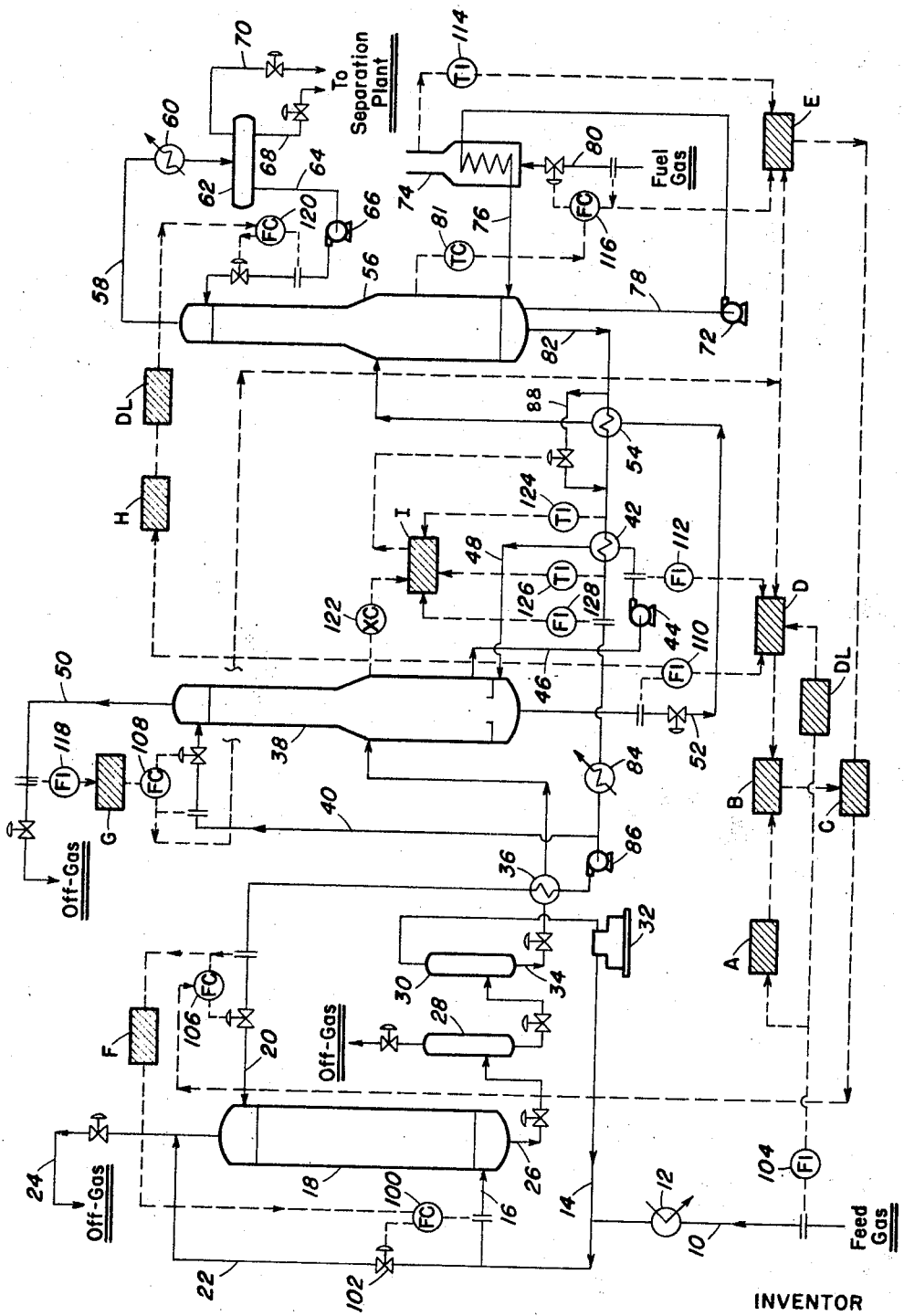

3,446,709
AUTOMATIC CONTROL OF GAS ABSORPTION UNIT
Louis Marshall, Great Neck, N.Y. (% The Lummus Company, 385 Madison Ave., New York, N.Y. 10017)
Continuation of application Ser. No. 530,674, Feb. 28, 1966. This application Nov. 22, 1967, Ser. No. 685,215
Int. Cl. B01d 3/34
U.S. Cl. 196—132    10 Claims

ABSTRACT OF THE DISCLOSURE

This invention relates generally to an improved apparatus of controlling an absorption plant such as is employed in the treatment of natural gas or other gaseous hydrocarbons for the recovery of certain constituents therefrom. More particularly, the invention relates to the use of analog control modules to maximize the flow of lean oil to a gas absorption tower and also to prevent flooding of the tower due to surges in the gas feed rate. The invention is applicable to substantially any gas absorption system wherein the gas composition is subject to only minor variations but the gas flow rate may vary over a broad range.

---

This application is a continuation of application 530, 674 filed Feb. 28, 1966 and now abandoned.

This invention relates generally to an improved apparatus of controlling an absorption plant such as is employed in the treatment of natural gas or other gaseous hydrocarbons for the recovery of certain constituents therefrom. More particularly, the invention relates to the use of analog control modules to maximize the flow of lean oil to a gas absorption tower and also to prevent flooding of the tower due to surges in the gas feed rate. The invention is applicable to substantially any gas absorption system wherein the gas composition is subject to only minor variations but the gas flow rate may vary over a broad range.

The treatment of hydrocarbon gases for recovery of desired constituents generally involves the absorption of said constituents into a suitable lean oil in an absorption tower, which is provided with a plurality of liquid-vapor contacting surfaces, such as packing, bubble trays or the like. The gas is passed countercurrent to the lean oil through this tower, the stripped gas passing overhead and fat oil being recovered as a bottoms product. The desired constituents are recovered from the fat oil in one or more fractionation towers. In these towers, countercurrent contact of liquid and vapor effects a separation of the higher boiling constituents into the bottoms product and the lower boiling constituents into the overhead product. Vapors are generated by heating the lower region of the tower and liquid is obtained by condensing a portion of the overhead and returning it to the tower as reflux.

At some point, the desired constituents are removed from the oil which, again being a lean oil, is recycled to the absorption tower. This may be done before or after all of the desired constituents are separated from each other.

The treatment of natural gas serves as a good example of this sort of process, though the invention is not limited thereto. It is often desired to recover separate ethane, propane, butane and gasoline fractions from natural gas, of which the major component is methane. To this end the gas is contacted in an absorption tower with a suitable lean oil which absorbs the desired components. The fat oil is processed through flash stages and a demethanizer where a methane-rich fraction is taken off as vapor and either recycled to the absorber or recovered as a fuel gas product. This methane fraction is a portion of the natural gas which is unavoidably absorbed with the desired components and must be separated therefrom. The liquid bottoms is then passed to a still where the lean oil is recovered as bottoms and an ethane through gasoline fraction is the overhead. This overhead is then partially condensed and passed to separate fractionation towers for separation of the mixture into individual desired fractions. The lean oil is cooled and recycled to the absorber.

In such a plant, a very high percentage of the higher boiling constituents is absorbed, and recovery of these components is only slightly affected by the lean oil rate. For lower boiling components, however, the percentage of recovery is approximately proportional to the lean oil rate fed to the absorber. When these components are high-value products, therefore, it is desirable to maintain the highest lean oil rate permitted by the equipment design in order to maximize their recovery. For a given plant, this maximum permissible lean oil rate is a variable which depends on the gas feed rate and composition and, according to the operating characteristics of the fractionating towers, is approximately inversely proportional to the gas feed rate. Thus, it is desirable to take advantage of tower capacity by increasing the lean oil rate when the gas feed rate decreases. On the other hand, it is necessary to decrease the lean oil rate when the gas feed rate increases in order to avoid flooding the tower. It is also necessary to limit the lean oil rate within the capacities of other towers and equipment in the plant.

Heretofore, several schemes have been proposed for control of individual process units with the aid of analog or digital computers. In U.S. Patent No. 2,990,437, an analog module utilizes a side-stream analysis to optimize the feed date to a depropanizer-deisobutanizer column. A feedforward control system for optimizing reflux in distillation columns was described in Chemical Engineering Progress, September 1962, pp. 37–41, and digital control of reboiler heat is described in ISA Transactions, April 1964, pp. 165–174. Analog feedforward control using feed analysis to optimize reflux in a superfractionator was described in Control Engineering, March 1964, pp. 69–74. As noted above, however, the proper lean oil feed rate in an absorption tower depends on variables from several process units as well as other factors, and the present invention is directed to such a control system.

It is thus a general object of the present invention to provide a control system for optimizing lean oil flow to an absorber.

Another object of the present invention is to provide a control system for a gas absorption system, which prevents flooding of the absorption zone while maintaining the maximum lean oil rate.

Yet another object of the invention is to provide a control system for a gas absorption plant which maximizes lean oil flow to the absorber and also provides stable operation of other processing units.

Still another object of the invention is to provide a supervisory control system for a gas absorption plant which changes the set points of certain controllers so as to maintain the maximum lean oil rate to the absorber consistent with the feed gas rate and other operating conditions.

Various other objects and advantages of the invention will become clear in the course of the following description of an embodiment thereof, and the novel features will be particularly pointed out in connection with the appended claims.

In describing the invention, reference will be made to the accompanying drawing, which is a simplified, schematic flow sheet of a natural gas absorption plant. In the drawing, dotted lines are used to indicate control lines, shaded boxes indicated analog computing modules, and individual control units are identified as follows:

FI—Flow Indicator
FC—Flow Controller
TI—Temperature Indicator
TC—Temperature Controller
XC—Concentration Controller Before describing the control system in detail, it will be useful to briefly describe the plant itself, which is conventional and which forms no part of the invention. Natural gas in line 10 is refrigerated at 12, mixed with recycle gas in line 14 and passed into the bottom of absorber 18 via line 16. Lean oil is supplied in line 20. A bypass line 22 is provided to accommodate surges in the gas flow rate, as more fully described hereinbelow. Overhead gas is taken off in line 24 for use or sale, and flat oil is withdrawn from the bottom of absorber 18 in line 26. The fat oil is passed through a pair of separator drums 28 and 30, off-gas from the former being combined with gas in line 24 after recompression or used as fuel gas, and off-gas from the latter being compressed at 32 and returned to the absorber via line 14. The fat oil is withdrawn from drum 30 in line 34, passes in heat exchange with returning lean oil at 36, and is charged into demethanizer 38. Reflux to demethanizer 38 is provided by lean oil in line 40, and reboiler duty is provided by exchanger 42, pump 44 and lines 46, 48. A methane fraction is removed from demethanizer 38 in line 50, and bottoms product is removed in line 52. The bottoms is again passed in heat exchange with the returning lean oil at 54 and is charged to the still 56. Overhead from still 56, comprising the ethane and heavier fraction of the feed, is taken off in line 58, condensed at 60 and passed to knock-out drum 62, where a liquid portion is withdrawn via line 64 and pump 66 to meet reflux requirements. Liquid and vapor products are passed to the separation plant (deethanizer, depropanizer, etc.) in lines 68 and 70, respectively. Reboiler service for the still is provided by pump 72, coil heater 74 and lines 76, 78, fuel gas being provided to the heater in line 80. A temperature controller 81 maintains the proper reboiler duty through controller 116.

Stripped lean oil is removed from the bottom of still 56 in line 82 and passed in seriatim through exchangers 54, 42 and 84, pump 86, exchanger 36 and line 20, which leads back to absorber 18. A bypass line 88 is provided around exchanger 54, for reasons described more fully hereinbelow.

The nine analog computing modules are identified by letters A–I. The two boxes marked DL are delay modules. Briefly, modules A–E are used to calculate the absorber lean oil rate, as limited by the absorber, demethanizer or still system. Module G calculates the demethanizer lean oil flow and module H calculates the still reflux rate required. The purpose of module G and H is to load towers 38 and 56 in accordance with their requirements and avoid restrictions on their capacities for lean oil flow due to unnecessarily high loadings. Module I calculates the heat duty of the demethanizer reboiler and stabilizes operation of this tower by correcting for changes in heat transfer (in exchanger 42) resulting from changes in lean oil flow rates. Module F calculates a limiting feed gas rate to the absorber and determines when feed gas must be bypassed around the system to avoid flooding of absorber 18. Standard modules capable of performing the computing functions described herein are manufactured by the Devar-Knetics Division of Consolidated Electrodynamics Co. (see Bulletin PL–671–A, March 1965).

It is to be noted that with the exception of modules B and C, which are comparators, the equations set forth hereinbelow are subject to variation depending on how accurately the equipment operation is to be represented. The equations will determine the particular configuration of computing modules required, but do not alter the control concept.

Module A receives a signal $F_a$ from flow indicator 104 and calculates the required absorber lean oil rate $L_a$ as a function of the total feed gas rate. This oil rate is the maximum operational value, and is just under the limiting rate at which absorber 18 would experience high entrainment or begin to flood. The equation is a straight line relation:

$$L_a = k_1 - k_2 F_a \qquad (1)$$

Module B is a comparator which compares the output signals of modules A and D and selects the lower value.

Module C is another comparator, this one comparing the lean oil rate selected by module B with that calculated by module E, and again selects the lower value. The output of module C resets lean oil flow controller 106 in line 20.

Module D calculates the allowable absorber lean oil rate $L_a'''$ as limited by the tray capacity in the stripping section of demethanizer 38. The purpose of this module is to prevent any increase in absorber lean oil rate if demethanizer 38 is already loaded. Module D receives four inputs. It receives the total gas flow $F_a$ from indicator 104 via a suitable delay line, the total lean oil to the demethanizer $L_d$ from flow controller 108, flow rate of demethanizer bottom $L_{out}$ from indicator 110, and flow rate of reboiler liquid $L_{in}$ from indicator 112. The equation is also a straight line relation, relating bottoms flow rate with reboiler vapor rate:

$$L_a''' = k_1 - k_2(L_{in} - L_{out}) - k_3 F_a - L_d \qquad (2)$$

In this equation, the expression $(L_{in} - L_{out})$ equals the amount of reboiler vapors generated and $k_3 F_a$ approximates the net recovered product. The delay line (DL) associated with the feed rate input $F_a$ corrects for the time difference between the absorber feed and the demethanizer feed. As noted above, the output of module D goes to comparator module B.

Module E calculates the absorber lean oil rate $L_a''$ limited by the tray capacity of the still stripping section, and restricts the lean oil rate if the still is already loaded. Module E receives three inputs. It receives a signal $T_h$ which is proportional to the flue gas temperature in heater 74 as measured by temperature indicator 114, it receives the fuel gas flow rate $G_h$ to reboiler heater 74 as controlled by controller 116, and it receives the lean oil rate to demethanizer 38, $L_d$, also sent to module D. The equation is also a straight line relating total lean oil with vapor rate, but in this instance the latter is expressed in terms of the approximate duty absorbed in the fired reboiler:

$$L_a'' = k_1 - G_h(k_2 - k_3 T_h) - L_d \qquad (3)$$

The foregoing can be summarized by stating that module E monitors the still, module D monitors the demethanizer and module A has the absorber maximum programed, and modules B and C pick the lowest value and set the lean oil rate.

Module F has an over-ride to bypass gas in the event of a gross increase in gas flow rate. This module calculates the maximum permissible gas feed rate to the absorber (line 16) as a function of the actual lean oil rate (line 20) and resets gas bypass controller 100, which releases feed gas to off-gas line 24 when the feed gas rate increases too rapidly. Module A sets the lean oil rate close to the maximum absorber rate, unless limited by module D or E (as described above). With the absorber operating close to maximum capacity, a large rise in the gas rate would cause the absorber to flood. To prevent this, the excess gas must be bypassed around the absorber via lines 22 and 24, until the lean oil rate (line 20) can be reduced appropriately. As the lean oil rate decreases, the allowable gas rate increases and module F resets bypass controller 100 to a higher value which, ultimately, closes bypass valve 102. Thus, module F receives a signal $L_a$ representing the actual lean oil rate as established by modules A–E. This calculates a signal $F_a'$ according to the equation $$F_a' = k_1 - k_2 L_a \qquad (4)$$

The constants in this equation are selected to give a value of $F_a'$ which is 5 to 10% higher than the value of $F_a$ in module A, for any given $L_a$. In this manner, bypass valve 102 remains closed during small fluctuations but opens on a large increase in gas rate.

Module G calculates the demethanizer lean oil flow $L_d$ as a function of the off-gas rate. Indicator 118 provides the necessary input signal $V_d$. Since still and possibly demethanizer capacity may limit the lean oil flow rate to the absorber, it is desirable to minimize the amount of demethanizer lean oil, in order to avoid such a limit. The relation between lean oil $L_d$ and off-gas $V_d$ limits the tower ethane loss to 1–2% of the demethanizer off-gas. The equation is:

$$L_d + k_1 + k_2 V_d \qquad (5)$$

Module H calculates the required still reflux rate as a function of the tower feed rate and resets the reflux flow controller. The adjustment of reflux permits the allowable lean oil rate to be maximized when still capacity is the overall limitation. The feed rate to the still $F_s$ is the same as the bottom flow from the demethanizer, so indicator 110 is employed in this service, a second delay line being inserted to correct for feedforward errors. It can be said that feed rate infers composition as well, since the relative amounts of recovered components are functions of lean oil rate only, as long as the absorber feed gas composition is substantially constant and the relationship between feed gas rate and lean oil rate is fixed by equations for equipment limitations. This in turn permits reflux rate to be a function only of feed rate. The approximate equation is:

$$L_r = k_1 + k_2 F_s - k_3 F_s^2 \qquad (6)$$

where $L_r$ is the reflux rate to the still. Output of module H operates flood controller 120.

The last analog computing unit, module I, calculates heat transferred in the demethanizer reboiler by the sensible heat change of the lean oil heating medium (line 82). The calculated duty is input to a B.t.u. controller which adjusts the valve in lean oil bypass line 88. Set point adjustment for this controller comes from the primary tower concentration controller 122. Temperature indicators 124, 126 are located on either side of exchanger 42 and flow indicator 128 provides the lean oil flow rate. Use of the B.t.u. controller stabilizes the demethanizer operation by minimizing variations in reboiler duty due to changes which the supervisory system makes in the absorber and demethanizer lean oil rates. The equation is:

$$Q = (L_a + L_d) k_1 (T_2 - T_1) \qquad (7)$$

Operation of the control system can be summarized as follows: Modules A–E form the supervisory control. They select the maximum lean oil rate that can be handled in the plant and control this function. Module F provides an over-ride which will bypass feed gas if the tower is in danger of flooding. Modules G, H and I stabilize operation of the demethanizer and still zones and are responsive to changes in the lean oil rate made by the supervisory control system.

It is to be emphasized that the system as herein described is a simplified one and that operation of other equipment may effect the allowable lean oil rate, in which case additional control modules and equations will be necessary. Thus, the capacities of heat exchangers, compressors, pumps, drums, or fired heaters may have to be taken into account. Further, it will be understood that while the invention has been described with reference to a plant designed to recover ethane and heavier from natural gas, the same system would function, for example, in a plant recovering propane and heavier. In such a case, the second tower is designed and operated as a demethanizer. The concepts relating to lean oil flow are exactly the same as hereinabove described.

Various other changes in the details, steps, materials and arrangements of parts, as illustrated and described herein in order to explain the nature of the invention, may be made by those skilled in the art within the principle and scope of the invention as defined in the appended claims. In the claims, the various signals have been numbered serially for purposes of clarity and ease of understanding, but it will be understood that there is no sequential relation between the various signals as might otherwise be implied.

What is claimed is:
1. In a gas separation plant having an absorber, a fractionator and a still, first conduit means for introducing a gas feed into the absorber, second conduit means for passing enriched lean oil from the absorber to the fractionator, third conduit means for passing fractionated lean oil from the fractionator to the still, and fourth conduit means for passing stripped lean oil from the still to the absorber to contact the gas feed, a control apparatus comprising:
   first means operatively connected to the first conduit means to establish a first signal representative of an allowable lean oil flow in the absorber as a function of gas feed rate in the first conduit means;
   second means operatively connected to the fractionator to establish a second signal representative of an allowable lean oil flow in said fractionator;
   third means operatively connected to the still to establish a third signal representative of an allowable lean oil flow in said still;
   fourth means connected to said first, second and third means for selecting the lowest of the first, second and third signals; and
   first control means connected to the fourth conduit means for controlling the flow of lean oil into the absorber, said first control means being operatively connected to the fourth means whereby said first control means is responsive to the signal selected by the fourth means and controls the flow of lean oil to the absorber in response to the selected signal.

2. The control apparatus as claimed in claim 1, and additionally comprising:
   fifth means connected to the fourth conduit means responsive to the actual lean oil flow rate into the absorber to establish a fifth signal representative of the maximum allowable gas feed rate to the absorber as a function of the actual lean oil feed rate to the absorber; and
   second control means connected to the first conduit means for controlling the flow of gas into the absorber, said second control means being operatively connected to the fifth means whereby said second control means is responsive to the fifth signal and controls the flow of gas into the absorber in response to the fifth signal.

3. The control apparatus as claimed in claim 1 wherein the fractionator includes a reboiler, and the fourth conduit means passes through the reboiler whereby stripped lean oil passes through the reboiler prior to introduction into the absorber to provide heat requirements for the reboiler, and further comprising:
   sixth means operatively connected to the fractionator and lean oil flowing through the reboiler to produce a sixth signal representative of the heat requirements of the reboiler; and
   heat control means connected to the fourth conduit means for controlling the heat content of the lean oil flowing to the reboiler without changing the flow rate thereof, said heat control means being connected to the sixth means whereby the heat control means is responsive to the sixth signal and controls the heat content of the lean oil flowing to the reboiler in response to the sixth signal.

4. The control apparatus as claimed in claim 1 wherein the still includes reflux means for providing the reflux requirements for the still and further comprising:
seventh means connected to the third conduit responsive to the rate of lean oil flowing from the fractionator to the still to produce a seventh signal representative of optimum reflux required for the still as a function of the rate of lean oil flowing from the fractionator to the still; and
third control means connected to the reflux means for controlling the rate of reflux to the still, said third control means being connected to the seventh means whereby the third control means controls the reflux rate in response to the seventh signal.

5. The control apparatus as claimed in claim 1 wherein the fractionator includes a fifth conduit means for withdrawing overhead from the fractionator and reflux means for providing the reflux requirements therefor, said reflux means including sixth conduit means for passing a portion of the lean oil being returned from the still to the absorber in the fourth conduit means to the fractionator as reflux, and additionally comprising:
eighth means connected to the fifth conduit means responsive to the rate of flow of overhead withdrawn from the fractionator to produce an eighth signal representative of the optimum reflux rate to the fractionator as a function of the overhead flow rate; and
fifth control means connected to the reflux means for controlling the rate of lean oil introduced as reflux, said fifth control means being connected to the eighth means whereby the fifth control means controls the rate of lean oil introduced as reflux in response to the eighth signal.

6. In a gas separation plant having an absorber, a fractionator including means for providing reflux and reboil thereto, a still including means for providing reflux and reboil thereto, the means for supplying reboil for the still including a heating means having a fuel supply means and a stack means, first conduit means for introducing a gas feed into the absorber, second conduit means for passing enriched lean oil from the absorber to the fractionator, third conduit means for passing fractionated oil from the fractionator to the still, and fourth conduit means for passing stripped lean oil from the still to the absorber to contact the gas feed, a control apparatus comprising:
first means, including a first flow indicating means connected to the first conduit means and a first analog computing module operatively connected to the first flow indicating means, to establish a first signal representative of an allowable lean oil flow in the absorber as a function of gas feed rate in the first conduit means;
second means operatively connected to the fractionator to establish a second signal representative of an allowable lean oil flow in the fractionator, said second means including a second analog computing module connected to each of a second, third and fourth flow indicating means connected to the third conduit and the means for providing reflux and reboil for the fractionator, respectively, and to the first flow indicating means;
third means operatively connected to the still to establish a third signal representative of an allowable lean oil flow in said still, said third means including a fifth flow indicating means connected to the fuel supply means, a temperature indicating means connected to the stack means and a third analog computing module; said third analog computing module being connected to the fifth flow indicating means for the fuel supply, the temperature indicating means and the third flow indicating means;
a comparator means connected to the first, second and third means for selecting the lowest of the first, second and third signals; and
first control means connected to the fourth conduit means for controlling the flow of lean oil to the absorber, said first control means being operatively connected to the comparator means whereby the first control means controls the flow of lean oil to the absorber in response to the signal selected by the comparator means.

7. The control system as claimed in claim 6 and additionally comprising:
a fourth means connected to the fourth conduit means responsive to the actual lean oil flow rate to the absorber to establish a fourth signal representative of the maximum allowable gas feed rate into the absorber as a function of the actual lean oil feed rate to the absorber, said fourth means including a sixth flow indicating means responsive to the lean oil feed rate to the absorber and a fourth analog computing module connected thereto; and
second control means connected to the first conduit means for controlling the flow of gas into the absorber, second control means being operatively connected to the fourth means whereby the second control means controls the flow of gas into the absorber in response to the fourth signal, said second control means including a seventh flow indicating means responsive to the gas flow rate into the absorber.

8. The control system as claimed in claim 7 wherein the fourth conduit means passes through the reboiler means for the fractionator whereby stripped lean oil passes in an indirect heat transfer relationship with a reboiler stream to provide heat requirements therefor, and additionally comprising:
fifth means operatively connected to the fractionator and the lean oil flowing through the reboiler to produce a fifth signal representative of heat requirements for the reboiler stream, said fifth means including a fifth analog computing module connected to a temperature indicating means responsive to the temperature of the lean oil introduced and withdrawn from the reboiler means, an eighth flow indicating means for the lean oil passing through the reboiler means and a concentration indicating means connected to the fractionation zone; and
third control means connected to the fourth conduit means for controlling the heat content of the lean oil flowing to the reboiler means including a heat exhanger and a bypass means therefor in the fourth conduit upstream of the reboiler means, said third control means being connected to the fifth means and the relative rate of flow of the lean oil through the heat exchanger and bypass therefor being controlled by the fifth signal.

9. The control system as claimed in claim 8 and additionally comprising:
a ninth flow indicating means connected to the third conduit means, said ninth flow indicating means connected to the third conduit providing a sixth signal representative of the flow of oil therein;
a delay module connected to the ninth flow indicating means for delaying the sixth signal;
a sixth analog computing module connected to the delay module to produce a seventh signal representative of the optimum reflux rate for the still for the flow indicated by the sixth signal; and
fourth control means connected to the reflux means for the still to control the reflux rate, said fourth control means being connected to the sixth analog computing module to control the reflux rate in response to the seventh signal.

10. The control apparatus as claimed in claim 9 wherein the reflux means for the fractionator includes a fifth conduit means connected to the fourth conduit means for passing stripped lean oil to the fractionator to provide reflux requirements therefor and additionally comprising:
- a sixth conduit means for withdrawing overhead from the fractionator;
- a tenth flow indicating means connected to the sixth conduit to produce an eighth signal representative of the overhead flow;
- a seventh analog computing module means connected to the tenth flow indicating means to establish a ninth signal representative of the optimum reflux for the fractionator for the overhead flow represented by the eighth signal; and
- fifth control means connected to the reflux means for controlling the rate of lean oil introduced into the fractionator through the fifth conduit means as reflux, said fifth control means being connected to the seventh analog computing module to control the reflux rate in response to the ninth signal.

References Cited

UNITED STATES PATENTS

| | | | |
|---|---|---|---|
| 2,262,202 | 11/1941 | Ragatz et al. | 196—132 X |
| 2,781,293 | 2/1957 | Ragatz | 196—132 X |
| 3,239,457 | 3/1966 | Heckart | 196—132 X |
| 3,296,097 | 1/1967 | Lupfea | 202—206 X |

OTHER REFERENCES

Pink, J. "Petroleum Refiner" vol. 38, No. 3 March 1959, pages 215–220.

Farrar, G. L., Process Automation in "The Oil and Gas Journal" Feb. 18, 1957, pages 121–126.

REUBEN FRIEDMAN, *Primary Examiner.*

JOHN ADEE, *Assistant Examiner.*

U.S. Cl. X.R.

55—160, 208, 225, 227

PO-1050
(5/69)

UNITED STATES PATENT OFFICE
CERTIFICATE OF CORRECTION

Patent No. 3,446,709      Dated May 27, 1969

Inventor(s)   LOUIS MARSHALL

It is certified that error appears in the above-identified patent and that said Letters Patent are hereby corrected as shown below:

Column 2, line 36, delete "date" and insert --rate--.

Column 3, line 2, delete "indicated" and insert --indicate--;
      line 19, delete "flat" and insert --fat--.

Column 5, equation 5 should appear as follows:

$$L_d = k_1 + k_2 V_d$$

Column 6, lines 4 and 5, delete "demethanizer" and insert --deethanizer--.

SIGNED AND
SEALED
JUN 16 1970

(SEAL)
Attest:

Edward M. Fletcher, Jr.
Attesting Officer

WILLIAM E. SCHUYLER, JR.
Commissioner of Patents